US005585717A

United States Patent [19]
Eriksson et al.

[11] Patent Number: 5,585,717
[45] Date of Patent: Dec. 17, 1996

[54] METHOD FOR MEASURING STARTER MOTOR CURRENT TO DETERMINE ENGINE STATUS

[75] Inventors: Robert Eriksson, Kungalv; Urban Kristiansson, Goteborg; Christer Lundstrom, Partille, all of Sweden

[73] Assignee: AB Volvo, Göteborg, Sweden

[21] Appl. No.: 938,150

[22] PCT Filed: Apr. 9, 1991

[86] PCT No.: PCT/SE91/00253

§ 371 Date: Dec. 23, 1992

§ 102(e) Date: Dec. 23, 1992

[87] PCT Pub. No.: WO91/16635

PCT Pub. Date: Oct. 31, 1991

[30] Foreign Application Priority Data

Apr. 23, 1990 [SE] Sweden ................... 9001443

[51] Int. Cl.⁶ ............... G01M 15/00; G01P 3/48
[52] U.S. Cl. .............. 324/166; 324/177; 73/116; 73/117.2
[58] Field of Search ................. 324/169, 166, 324/177, 402, 391, 392; 73/116, 117.2, 117.3; 364/431.1; 123/179.3

[56] References Cited

U.S. PATENT DOCUMENTS

| | | | |
|---|---|---|---|
| 3,134,943 | 5/1964 | Evenson | 324/169 |
| 3,202,910 | 8/1965 | Fathauer | 324/169 |
| 3,543,109 | 11/1970 | Minks | 324/169 |
| 3,602,817 | 8/1971 | Nilson | 324/169 |
| 3,822,402 | 7/1974 | Vest | 324/169 |
| 3,839,906 | 10/1974 | Hanson | 73/115 |
| 3,870,954 | 3/1975 | Hanson et al. | 324/772 |
| 3,938,378 | 2/1976 | Fineman et al. | 73/117.2 |
| 3,952,586 | 4/1976 | Hanson et al. | 73/116 |
| 3,964,301 | 6/1976 | Hanson et al. | 73/116 |
| 3,967,603 | 7/1976 | Habert | 324/169 |
| 3,968,425 | 7/1976 | Hanson et al. | 324/392 |
| 4,027,532 | 6/1977 | Trussell et al. | 73/117.2 |
| 4,050,297 | 9/1977 | Pettingell et al. | 73/117.2 |
| 4,059,799 | 11/1977 | Faria | 324/169 |
| 4,062,232 | 12/1977 | Sutphin, Jr. | 73/117.2 |
| 4,095,178 | 6/1978 | McLeod, Jr. | 324/169 |
| 4,126,037 | 11/1978 | Hanson et al. | 73/116 |
| 4,128,005 | 12/1978 | Arnston et al. | 73/117.3 |
| 4,144,746 | 3/1979 | Maringer et al. | 73/117.2 |
| 4,251,774 | 2/1981 | Knodler | 324/169 |
| 4,687,991 | 8/1987 | Kruncos | 324/169 |
| 4,809,540 | 3/1989 | Lackener et al. | 73/117.2 |
| 5,109,192 | 4/1992 | Kanno | 324/169 |
| 5,189,907 | 3/1993 | Marino et al. | 73/116 |

Primary Examiner—Sandra L. O'Shea
Assistant Examiner—J. Patidar
Attorney, Agent, or Firm—Burns, Doane, Swecker & Mathis, L.L.P.

[57] ABSTRACT

A measuring method for vehicles equipped with an internal combustion engine, the engine including a starter battery and a driven staffer motor used when an attempt is made to start the engine, is disclosed. According to the method, a voltage across a measuring shunt inserted in a current circuit between the battery and the starter motor is repeatedly measured, at a sampling rate, during each revolution of a crankshaft of the engine during activation of the starter motor. Corresponding values of a current delivered from the starter battery to the starter motor are derived from voltage measuring results. Values of the current are registered in a memory of a measuring computer. The registered values are used to establish a status of the combustion engine and its starting system. A value of a derivative of a rotational speed of the combustion engine crankshaft is obtained from the registered values. The sampling rate is sufficiently high to permit obtaining the value of the derivative of the rotational speed of the combustion engine crankshaft.

3 Claims, 1 Drawing Sheet

Interval between
two maximum current
conditions 5,585,717

METHOD FOR MEASURING STARTER MOTOR CURRENT TO DETERMINE ENGINE STATUS

FIELD OF THE INVENTION

The subject invention concerns a measuring method for use in vehicles equipped with an internal combustion engine which is connected to the starter-battery driven starter motor when an attempt is made to start the engine.

BACKGROUND AND SUMMARY

There is a well-known need for measuring the number of revolutions of the crankshaft in vehicle engines. In most normal cases, measurements for this purpose could be done with the aid of some kind of sensor, such as a sensor that generates pulses of optical or inductive type mounted on e.g. the flywheel.

In some situations it may be desirable to be able to measure the rotational speed of the engine crankshaft during the course of the engine starting process. The measurement readings could then be used to establish the condition of or give a diagnosis on the starting system. By the expression "starting system" should in this case be understood the circuit comprising the starter motor, the generator, the starter battery, the ignition system and the wiring required to interconnect these items. A diagnosis of this kind is instrumental in establishing a value of the rotational speed during the starting process, and this value is then compared with an already known set value established in dependence on a number of parameters, such as the engine temperature or the state of charge of the battery. When deviations from the expected set value of the rotational speed during the starting process are found the conclusion may be drawn that some fault exists in the starting system.

If one knows the rotational speed when a certain piston is approaching its top-dead-center position, it may also be possible to decide whether or not fuel should be injected into the engine. Consequently, unnecessary fuel injections may be avoided, since an explosion could not occur in any case because of the too low rotational speed of the crankshaft.

In connection with the engine starting process the demands on accuracy of measurement of the rotional speed or number of revolutions are particularly severe, for which reason sensors of conventional kinds are not entirely satisfactory. In the course of the starting process, the number of crankshaft revolutions are few but the speed thereof varies considerably. During conditions of continuous operation the number of revolutions of the crankshaft remains comparatively stable, a condition that makes it possible to establish a mean value derived from several revolutions. This mean value is comparatively accurate since there is very little variation in the number of revolutions. On the other hand, since the rotational speed of the crankshaft thus varies heavily during the starting process, a mean value on the basis thereof would be grossly deceptive.

Conventional sensors generally are not sufficiently accurate or fail to provide sufficient resolution to be used for measuring purposes during the engine starting process. A sensor designed for this purpose therefore would be unnecessarily expensive.

A considerable advantage therefore would be gained, if it were possible to obviate the need for a sensor of a conventional kind.

By means of the subject invention it has become possible to measure the rotational speed of the crankshaft in an internal combustion engine. A measuring method of this kind is of particular use during the starting process and obviates the need for conventional revolution counters in that it makes use of the existing measurement of current or voltage associated with the vehicle starter motor.

The above purpose is achieved by means of a measuring method of the kind outlined in the introduction which is characterized in that the voltage across a measuring shunt inserted in the current circuit between the battery and the starter motor is measured on several occasions recurring essentially periodically in connection with the activation of the starter motor, in that the values of the current delivered from the starter battery to the starter motor are derived from the voltage measuring results and are stored in the memory of a measuring computer, and are used to establish the status of the combustion engine and its starting system.

BRIEF DESCRIPTION OF THE DRAWINGS

The invention will be described in the following in closer detail with reference to the accompanying drawings, wherein.

DETAILED DESCRIPTION

When an attempt is made to start a combustion engine, a starting motor will be activated in the conventional manner. By the expression "combustion engine" is to be understood in this context an engine having periodically occurring expansion and compression phases of operation. When an attempt is made to start the engine, the starter motor is in contact with the flywheel of the engine and, in the manner known per se forces the crankshaft to rotate.

During the compression stroke of the various cylinders of the engine, the power output of the starter motor required to allow the motor to turn the engine crankshaft is comparatively large. Correspondingly, the power output required from the starting motor during the cylinder expansion stroke in order to maintain the rotational movement of the crankshaft is a great deal smaller.

Such periodically varying power output requirements from the starter motor are reflected proportionally in the amount of starter motor current that the starter battery delivers to the starter motor.

Figure 1:
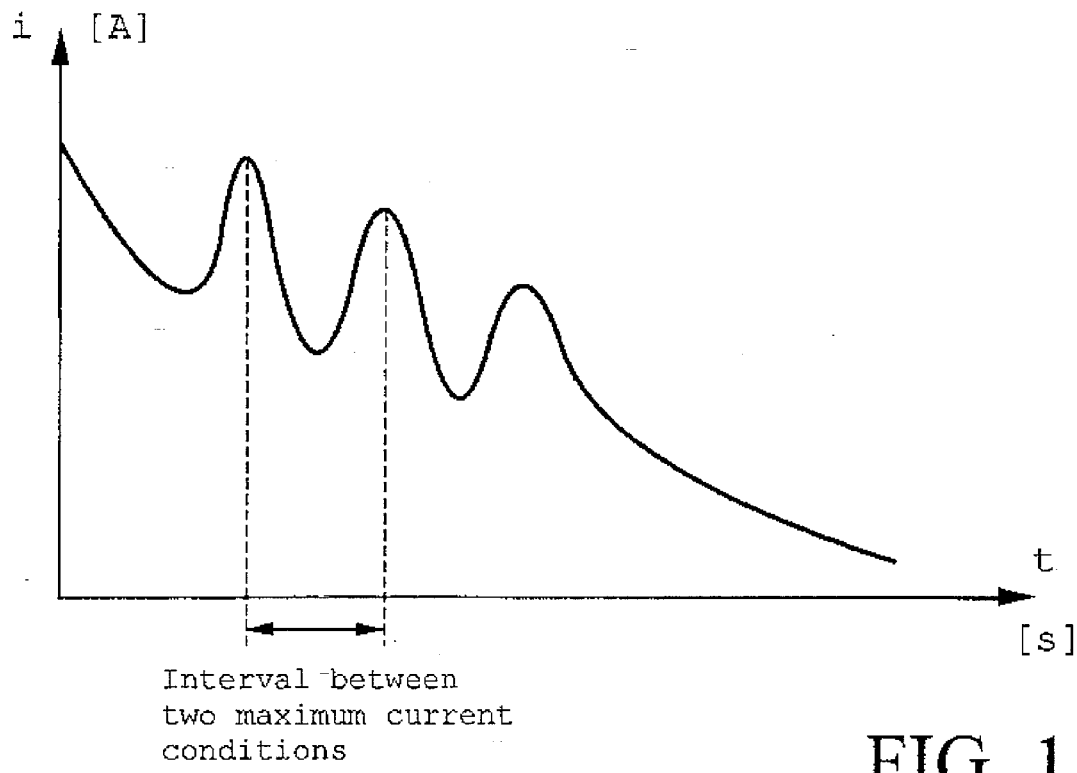
FIG. 1 illustrates schematically the variations of the starter motor current in a motor vehicle.

Because the compression and expansion strokes of the engine cylinders recur periodically, the current variations of the starter motor will fluctuate accordingly. This phenomenon is illustrated in FIG. 1. In this drawing figure, the three distinct peaks of the current curve indicate maximum loads and the three distinct dips of the current curve indicate miminum loads on said starter motor. A maximum load condition will occur when a certain piston in the combustion engine is moving and has obtained its maxiumum of compression immediately prior to reaching its top dead-center position.

As also appears from FIG. 1, the time interval between the occurrence of two maximum load conditions of the starter motor current will correspond to the time interval between two instances of compression of the engine cylinders. With knowledge of the number of cylinders of the type of engine in question it becomes possible to establish a numerical value of the rotational speed of the output crankshaft of the engine.

Figure 2:
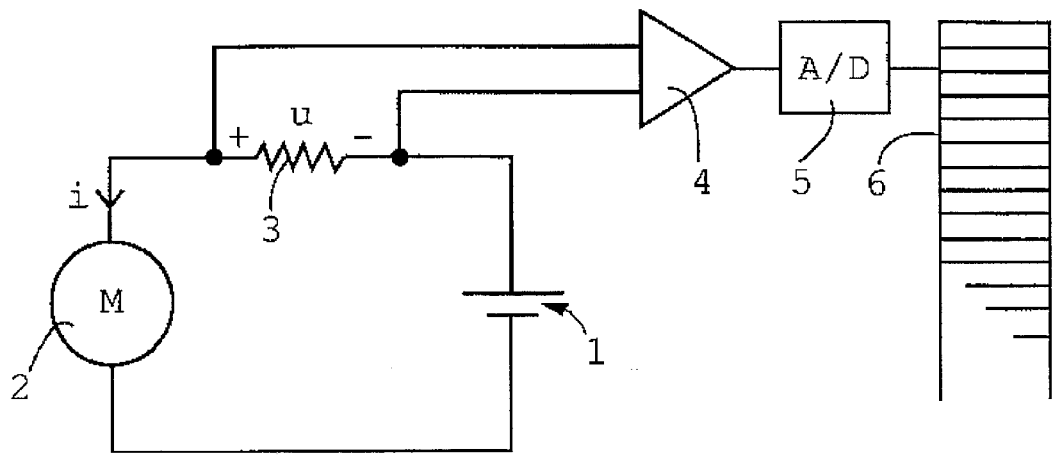
FIG. 2 illustrates schematically the design of a measuring system for use in connection with the measurement in accordance with the invention.

FIG. 2 illustrates in a simplied manner the electric circuitry of a measuring system in accordance with the invention intended for measuring the rotational speed. In the conventional manner a starter motor 2 is connected to a starter battery 1, and during the starting process, the starter motor 2 is in contact with the internal combustion engine (not shown) of the vehicle. Between the starter battery 1 and the starter motor 2 is inserted a measuring shunt 3, preferably in the form of an electrical conductor having a carefully defined resistance.

The measuring shunt 3 is connected to a measuring amplifier 4 by means of which are measured the voltage drops that the current (i) causes across the measuring shunt 3. When an attempt is made to start the engine the voltage (u) across the measuring shunt 3 thus is measured. The measuring amplifier 4 is in turn connected to an A/D converter 5 to which the analogue measurement readings from the measuring amplifier 4 are supplied and then converted into digital form. The digital measurement values are then stored in a memory unit 6 of a micro-processor based measuring computer (not shown). In this context it should be pointed out that the features referred to in the foregoing regarding the various components of the measuring system belong to a technology that is well known to the expert and that therefore these components do not as such form part of the subject invention.

When an attempt to start the engine is made, the voltage (u) across the measuring shunt 3 will be measured frequently. Between each measuring operation a pre-determined time interval will lapse, the length of which depends on the measuring frequency, i.e. the frequency corresponding to the time interval between two measuring operations. From this, the expert readily understands that the value of the lowest conceivable measuring frequency in accordance with the so called sampling rate theorem necessarily must exceed twice the expected value of the maximum number of revolutions of the engine during the starting process. The concept 'number of revolutions during the starting process' should, in this context, be considered equivalent, to some extent the frequency of the periodically varying current (i) of the starter motor. Obviously, the higher the measuring frequency, the more exact the measuring results. When the value of the measuring frequency is sufficiently high, it is also possible to obtain a value of the derivative of the rotational speed, i.e. the rate of increase or decrease of the rotational speed of the crankshaft at any given moment.

Since the resistance of the measuring shunt 3 is known beforehand, the measuring computer may determine the values of the current (i) that correspond to the various values of the voltage (u) as measured. These computed values of the current (i) will be stored in the memory unit 6.

Using a suitable calculating algorithm the measuring computer is able to compute, on the basis of the thus stored values of the starting motor current (i), the maximum values thereof when an attempt is made to start the engine. In accordance with the above description, these maximum values will recur at moments that are determined by the number of revolutions of the engine. Since the measuring frequency, and thus the interval of time between the various measuring operations during a starting process, is known beforehand, it becomes possible to determine the time that has lapsed between two consecutive maximum values of the starter motor current. The rotational speed of the engine is then derived from this value.

Instead of measuring the starter motor current it could be possible to measure the voltage across the poles of the starting motor, since this voltage varies periodically in the same manner as does the starter motor current.

In addition, it is possible to determine the compression of the various cylinders by analyzing the variations of the starter motor current. Low compression conditions correspond to the lower and rounded peaks in the curve of the current-time diagram illustrated in FIG. 1. This, in turn, is due to the fact that less power need to be drawn from the starter motor during attempts to start the engine. Correspondingly, increased compression of an individual cylinder will be registered as higher peaks of the starter motor current. According to a preferred embodiment of the method, a voltage is measured across the measuring shunt 3 inserted in the current circuit between the battery 1 and the starter motor 2 using a sampling rate sufficiently high to obtain a value of a derivative of a rotational speed during each revolution of a crankshaft of the engine during activation of the starter motor. Corresponding values of a current delivered from the starter battery to the starter motor are derived from voltage measuring results. Values of the current are registered in a memory 6 of a measuring computer. The registered values are used to establish the status of the combustion engine and its starting system. The registered values are compared to values of the current that correspond to predetermined or previously stored values associated with values of compression of individual cylinders in the combustion engine, and a measure of a real value of compression of the individual cylinders in the combustion engine is derived from a comparison of local variations of the registered values with the values of the current that correspond to the predetermined or previously stored values of compression.

While this invention has been illustrated and described in accordance with a preferred embodiment, it is recognized that variations and changes may be made therein without departing from the invention as set forth in the claims.

We claim:

1. A measuring method for vehicles equipped with an internal combustion engine comprising a starter battery and a driven starter motor used when an attempt is made to start the engine comprising the steps of repeatedly measuring a voltage across a measuring shunt inserted in a current circuit between the battery and the starter motor, at a sampling rate, during each revolution of a crankshaft of the engine during activation of the starter motor, deriving corresponding values of a current delivered from the starter battery to the starter motor from voltage measuring results, registering values of the current in a memory of a measuring computer, the registered values being used to establish a status of the combustion engine and its starting system, obtaining a value of a derivative of a rotational speed of the combustion engine crankshaft from the registered values, the sampling rate being sufficiently high to permit obtaining the value of the derivative of the rotational speed of the combustion engine crankshaft.

2. A measuring method as claimed in claim 1, wherein the values of the current registered in the computer are compared to values of the current that correspond to predetermined values of compression of the individual cylinders in the combustion engine, and a measure of the real value of compression of the individual cylinders in the combustion engine is derived from a comparison of local variations of the registered values of the current with the values of the current that correspond to said predetermined values of compression.

3. A measuring method for vehicles equipped with an internal combustion engine comprising a starter battery and a driven starter motor used when an attempt is made to start the engine comprising the steps of measuring a voltage across a measuring shunt inserted in a current circuit between the battery and the starter motor using a sampling rate sufficiently high to obtain a value of a derivative of a rotational speed during each revolution of a crankshaft of the engine during activation of the starter motor, deriving corresponding values of a current delivered from the starter battery to the starter motor from voltage measuring results, registering values of the current in a memory of a measuring computer, the registered values being used to establish the status of the combustion engine and its starting system, the registered values being compared to values of the current that correspond to previously stored values associated with values of compression of individual cylinders in the combustion engine, and a measure of a real value of compression of the individual cylinders in the combustion engine being derived from a comparison of local variations of the registered values with the values of the current that correspond to the previously stored values of compression.

* * * * *